Figure 1:
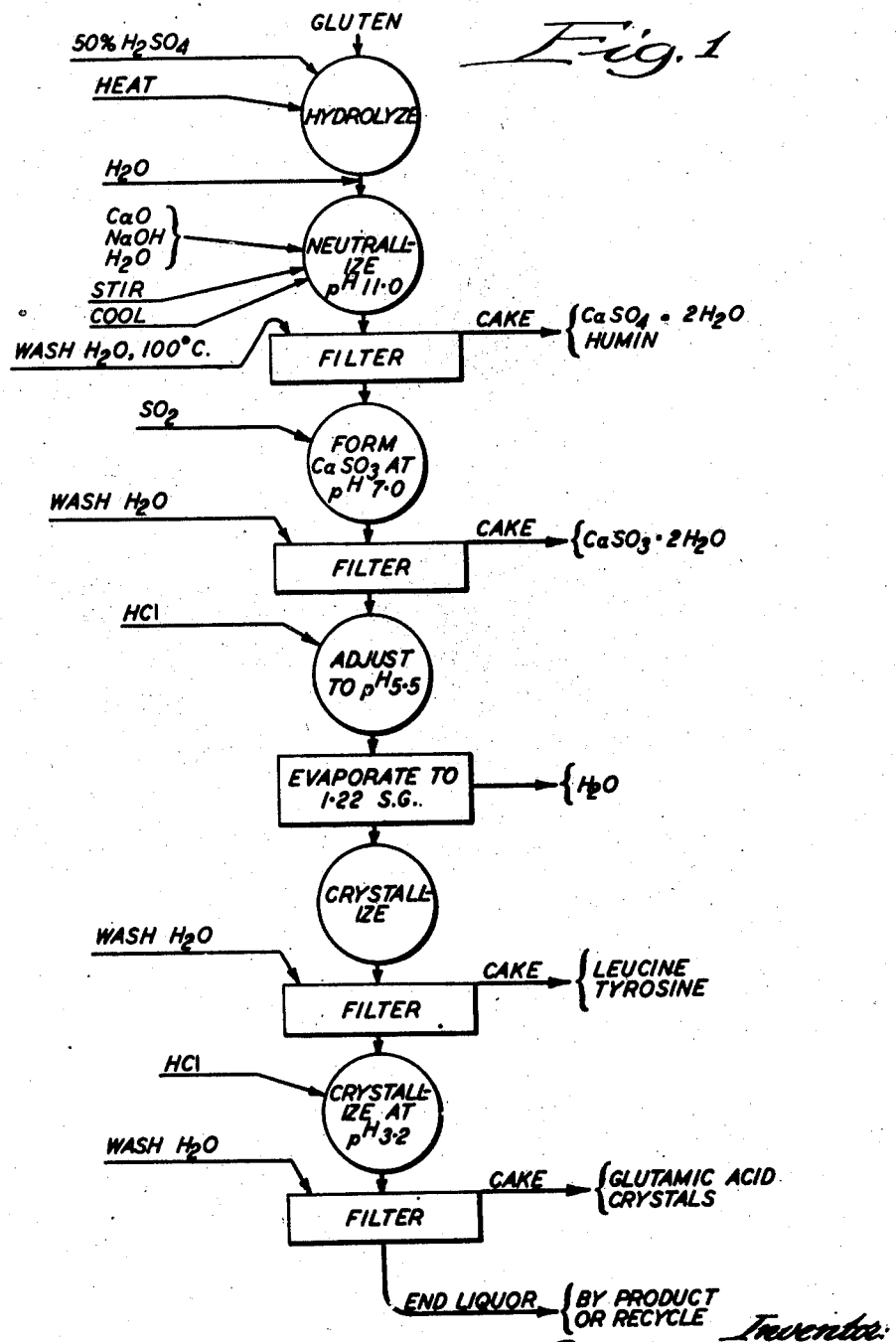

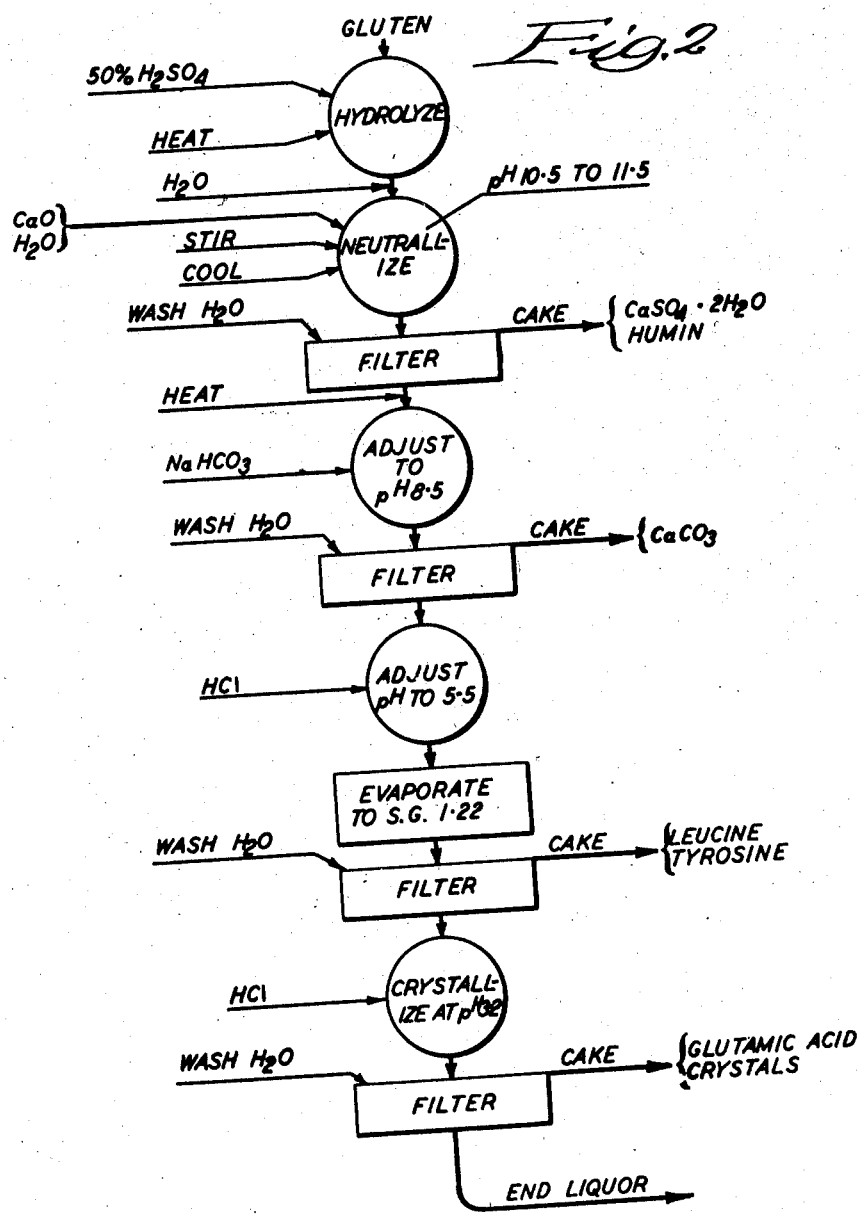

Patented Dec. 23, 1947

2,433,219

UNITED STATES PATENT OFFICE 2,433,219

MANUFACTURE OF GLUTAMIC ACID

Forest A. Hoglan, Toledo, Ohio, assignor to International Minerals & Chemical Corporation, Chicago, Ill., a corporation of New York Application May 7, 1945, Serial No. 592,393

6 Claims. (Cl. 260—529)

The invention relates to improvements in the manufacture of glutamic acid and particularly l(+) glutamic acid, sometimes called d-glutamic acid, and is of especial value in the production of such a product by the acid hydrolysis of proteins.

The invention will be described particularly with reference to the production of this material from gluten, although it will be understood that it is applicable to other raw materials such as protein derived from soybeans which will respond to a similar treatment subject, of course, to any slight differences in procedure which will be recognized as desirable or necessary by persons skilled in the art.

Heretofore in the production of l(+) glutamic acid by either acid hydrolysis or alkaline hydrolysis, it has been necessary to produce the material in a more or less crude form, requiring a subsequent and rather complicated and expensive purification process accompanied by a reduction in yield, so that the manufacturing cost of the final product is adversely affected.

The principal object of the present invention is to provide an organized procedure for the production of l(+) glutamic acid in the raw or initial crystal form of such purity that no special or expensive purification step or procedure is required in order to obtain a product which is suitable for direct conversion into mono-sodium glutamate, which is the form in which the material is ordinarily marketed.

General method

In its broadest aspects, it may be said that the invention can be practiced according to the following general procedure:

*The acid hydrolysis step.*—Because of its recognized advantages from a practical operating standpoint, sulfuric acid is selected as the particular acid which is utilized for effecting the initial hydrolyzation of the protein. This hydrolysis step is effected by subjecting the protein to the action of sulfuric acid at a sufficiently high temperature and pressure for a sufficient length of time to effect a substantially complete hydrolysis. In this step, in the case of gluten, it is found desirable to use the sulfuric acid in a concentration of about 50%. With acid at this strength, the treatment at 135° C. would require about 1 to 2 hours, and, if the temperature is reduced, the length of treatment is correspondingly extended. The gluten-acid ratio should preferably be about 1 part of gluten to 2 parts of the 50% acid.

When the hydrolysis step is practiced at the usual minimum temperature of 115° C., the step can be carried out under ordinary reflux conditions, whereas, in the case of the high temperatures, it is necessary to conduct the process at super-atmospheric pressure in an auto-clave or with similar equipment.

*The neutralization step.*—After the protein has been completely hydrolyzed, the hydrolysate is allowed to cool, and there is added a sufficient quantity of alkaline material, preferably in the form of an alkaline earth metal oxide or hydroxide, so that there will be sufficient alkaline material to react completely with all of the $SO_4$ radical to form an insoluble sulfate in the form of a precipitate, while at the same time enough alkaline material is added to raise the pH of the hydrolysate to a point substantially above neutral, as for example about 10.5 to 11.5.

*Removal of inorganic salts.*—The insoluble sulfate precipitate is then removed by filtration or the equivalent. The filtrate will be found to contain an additional quantity of deleterious metallic ions, and the next step in the process is for the purpose of removing these residual metallic ions, or at any rate that part which later would be disadvantageous in subsequent steps of the process.

*Elimination of unwanted metallic ions.*—The unwanted metallic ions (in the case where lime has been used as the neutralizing agent—calcium) may be precipitated in various ways, preferably by treating the filtrate with a substance which will react with the unwanted metallic ions in the solution to form a material which can be precipitated safely. Examples of such reagents are $SO_2$, acid sodium carbonate, $NaHCO_3$, $CO_2$, sodium carbonate, $Na_2CO_3$, and various phosphates. Where $SO_2$ is used to eliminate unwanted calcium ions, the precipitate formed will be calcium sulfite. The precipitate is removed by filtration or the equivalent. In this the second precipitation, the pH of the solution should be maintained around 7 or 8.5–9.

*Concentration of glutamic acid liquor.*—In the previous steps of the process, largely because of the necessity of using substantial amounts of wash water as an incident to the avoidance of loss in the filtration steps, the bulk has been increased to such an extent that the solution must be concentrated in order to facilitate proper crystallization of the glutamic acid. This is preferably effected in any desired type of evaporating equipment, for example a vacuum pan, preferably at a temperature not exceeding 65° C., with a corresponding vacuum. Preferably, the concentrated solution should have a specific gravity of from 1.20 to 1.25 at 40° C. During this concentration step, the pH has been maintained at a point substantially above 3.2, the iso-electric point of l(+) glutamic acid, in order to prevent too early crystallization of the material.

*The elimination of unwanted amino acids.*— The concentrated filtrate from which the undesired metallic ions have been eliminated according to the foregoing procedure, contains such unwanted amino acids as tyrosine, leucine, and iso-leucine, and it is desirable to remove these materials before the pH is reduced to 3.2 for the crystallization of l(+) glutamic acid. This removal is effected by maintaining the pH of the concentrated solution at a point substantially above that which is optimum for the precipitation of glutamic acid, for example about 5.0 or more, these unwanted amino acids being crystallized preferably by holding the solution at the desired pH for a sufficient length of time to permit crystallization to be substantially completed. A 24 hour holding period is usually sufficient, at room temperature. The crystallized amino acids are then removed by filtration or the equivalent. The filtrate containing the glutamic acid in solution is then conducted to a crystallizing vat or tank where the pH is adjusted to a point that is optimum for the crystallization of glutamic acid, i. e. about 3.2, by addition of hydrochloric acid or other suitable acidifying agent. The crystallization, when effected at room temperature, will require from 1 to 6 days.

It will be understood that the cakes obtained from the first three filtration steps will contain other unwanted substances in addition to the substances mentioned as eliminated by said filtration steps. For example, in the first filtration step, a large amount of humin material will be taken out along with the calcium sulfate. However, in the final crystallization step, the crystals of l(+) glutamic acid will be found to be of high purity and substantially uncontaminated with other extraneous materials, so that, after the crystals have been separated from the end liquor by a final filtration step or the equivalent, such crystals will be found to consist almost entirely of l(+) glutamic acid. The purity of the material is further shown by the fact that it is of extreme whiteness and does not have the objectionable brown appearance which is shown by glutamic acid crystals initially produced by other known commercial processes. After washing, the crystals may be used without further purification, in order to produce mono-sodium glutamate by mere treatment with caustic soda according to known methods.

The end liquor resulting from the foregoing process may, in certain instances, be re-cycled once or twice, but eventually it is desirable to remove it from the system and convert it into a by-product which will contain important quantities of various amino acids and some sodium chloride resulting from the use of any sodium reagent in any prior step of the process. This end liquor, in its original, concentrated or dry form, is a valuable flavoring material after its acidity has been neutralized by known methods.

In the drawings accompanying this application,

Fig. 1 is a flow sheet of one example of the invention in which lime is employed as the principal neutralizing agent, and SO₂ is used for eliminating residual calcium ions; and Fig. 2 is a flow sheet of an example in which acid sodium carbonate is employed for the elimination of unwanted metallic ions.

*Example 1*

The procedure, so far as the hydrolysis step is concerned, is carried on in the manner previously outlined. In the specific instance, a temperature of 115° C. is employed for a period of about 7 hours, gluten being the starting material and sulfuric acid being the hydrolytic agent.

After the hydrolysate is discharged from the hydrolyzer, a sufficient amount of water is added so that the slurry resulting from the neutralization step will be of the proper concentration for the particular filtering equipment employed. The diluted hydrolysate is then cooled in the neutralizing tank, and, at that point, a sufficient amount of hydrated lime, preferably in the form of a slurry of calcium hydroxide, is added to raise the pH to a point considerably in excess of neutrality, for example, in the present instance, to about 11.0.

The result of this will be that the sulfuric acid will be substantially all converted to calcium sulfate, which, being substantially insoluble, will be precipitated. The slurry resulting from the aforesaid neutralization step is then passed through a filtrate or equivalent device, the temperature of the slurry at this point being about 70° C. The cake from the filtrate consists largely of calcium sulfate and humin material.

It will be understood that, in order to avoid loss of valuable filtrate, it is advisable to follow up the hydrolysate with wash water. The filtrate, which, as has been stated, is still at a pH of 11.0, is then conducted into a reaction tank where it is treated with SO₂. The SO₂ reacts with the residual calcium ions in the filtrate to form calcium sulfite. It will be understood that, during this step of the process, the pH will be reduced by the addition of SO₂, and it is advisable to maintain the pH at a point close to neutrality. Otherwise undesirable effects will appear. This may be effected by adding sodium hydroxide from time to time in this stage of the process. However, it is found advantageous to add this pH-maintaining hydroxide along with the neutralizing lime, since it has no bad effect during any subsequent step of the complete process. This sodium hydroxide is added in the form of a strong aqueous solution, in an amount representing, in the form of solid sodium hydroxide, about 10% of the weight of CaO added.

In such case, the amount of lime required to be added is correspondingly reduced, and the amount of calcium ions in solution is very much reduced, requiring much less SO₂ in the sulfite precipitation stage.

The slurry resulting from the last mentioned step of the process is passed through a filter or similar equipment and is followed by wash water in the usual manner. The cake from this filter is substantially all calcium sulfite.

The filtrate is then treated with a mineral acid, H₂SO₄, but preferably hydrochloric acid, so as to reduce the pH to between 5.5 to 6, and the acidified filtrate is then conducted into a vacuum pan where, at a temperature of about 65° C. or less, it is concentrated to a specific gravity of about 1.22. The concentrated filtrate is then put into a crystallizer and held at room temperature for about 24 hours, during which time the leucine, tyrosine and other amino acids will crystallize.

The slurry from the crystallizer is then filtered and washed. The filtrate is then handled in the same manner as previously described in connection with the general description.

*Example 2*

In this example, instead of using sulfur dioxide to form calcium sulfite, as an insoluble precipitate, acid sodium carbonate, $NaHCO_3$, is employed to form insoluble calcium carbonate. Also, in this example, it is not necessary to employ additional sodium hydroxide for the purpose of maintaining the pH of the filtrate, because acid sodium carbonate will maintain a pH of about 8.5. Therefore, no sodium hydroxide is employed in the liming step. In this particular example, in the carbonate stage, the pH is maintained at about 8.5, which is the proper pH value for precipitation of calcium carbonate. The pH is subsequently adjusted to 5.5. In other respects, the procedure is substantially the same as in Example No. 1. In this example, as in the prior Example No. 1, the sodium added in the form of carbonate remains in solution and appears in the end liquor as sodium chloride, as in the first example.

I claim:

1. In the process of producing l(+) glutamic acid by hydrolysis of a protein with sulfuric acid, the improvement which consists in adding an excess of an alkaline earth metal compound selected from the group consisting of alkaline earth metal oxides and hydroxides to the acidic protein hydrolysate to obtain a pH of between about 10.5 and about 11.5 in the resulting solution, and then removing the resultant alkaline earth metal sulfate precipitate from the reaction mixture.

2. The process of claim 1 in which the alkaline earth metal compound added to the acidic hydrolysate solution is calcium hydroxide, the pH of the resulting solution is about 11, and the alkaline earth metal precipitate is calcium sulfate.

3. The process of claim 1 in which the residual alkaline earth metal present in the mixture due to the use of excess alkaline earth metal compound is removed as an alkaline earth metal carbonate precipitate by reacting the mixture with $CO_2$ while maintaining the reaction mixture at a pH of between about 8.5 and about 9.

4. The process of claim 1 in which the residual alkaline earth metal present in the mixture due to the use of excess alkaline earth metal compound is removed as an alkaline earth metal carbonate precipitate by reacting the mixture with $NaHCO_3$ while maintaining the reaction mixture at a pH of between about 8.5 and about 9.

5. In the process of producing l(+) glutamic acid by hydrolysis of a protein with sulfuric acid and in which the resultant acidic hydrolysate is contaminated with humin, the improvement which consists in adding an alkaline earth metal compound selected from the group consisting of alkaline earth metal oxides and hydroxides together with an alkali metal compound selected from the group consisting of alkali metal oxides and hydroxides to the acidic hydrolysate to obtain a pH of between about 10.5 and about 11.5 in the resulting solution, and then removing the resultant alkaline earth metal sulfate precipitate together with precipitated humin from the reaction mixture.

6. In the process of producing l(+) glutamic acid by hydrolysis of gluten with sulfuric acid and in which the resultant acidic hydrolysate is contaminated with humin, the improvement which consists in adding calcium hydroxide and sodium hydroxide to the acidic hydrolysate to obtain a pH of about 11 in the resulting solution, removing the resultant calcium sulfate precipitate together with precipitated humin from the reaction mixture, reacting residual calcium present in the reaction mixture with $CO_2$ while maintaining the pH of the mixture at about 8.5 to about 9.0 and then removing the resultant calcium carbonate precipitate from the reaction mixture.

FOREST A. HOGLAN.

REFERENCES CITED

The following references are of record in the file of this patent:

UNITED STATES PATENTS

| Number | Name | Date |
|---|---|---|
| 1,938,512 | Bromig | Dec. 5, 1933 |
| 1,973,574 | Marshall | Sept. 11, 1934 |
| 1,974,554 | Ziegler | Sept. 25, 1934 |
| 1,992,462 | Barnett | Feb. 26, 1935 |
| 2,098,923 | Mertz | Nov. 9, 1937 |
| 2,180,637 | Kemmerer | Nov. 21, 1939 |
| 2,194,302 | Gerber | Mar. 19, 1940 |
| 2,347,220 | Shildneck | Apr. 25, 1944 |